United States Patent
Kudo (10) Patent No.: US 8,452,534 B2
(45) Date of Patent: May 28, 2013

(54) ROUTE SEARCH DEVICE AND ROUTE SEARCH METHOD

(75) Inventor: Takefumi Kudo, Kanagawa (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 13/376,703

(22) PCT Filed: Jun. 1, 2010

(86) PCT No.: PCT/JP2010/059284
§ 371 (c)(1),
(2), (4) Date: Feb. 28, 2012

(87) PCT Pub. No.: WO2010/143563
PCT Pub. Date: Dec. 16, 2010

(65) Prior Publication Data
US 2012/0158291 A1    Jun. 21, 2012

(30) Foreign Application Priority Data
Jun. 8, 2009 (JP) .................. 2009-137717

(51) Int. Cl.
*G01C 21/00* (2006.01)
*G08G 1/123* (2006.01)

(52) U.S. Cl.
USPC ............ 701/430; 340/995.21; 340/995.22

(58) Field of Classification Search
USPC ........... 701/400–541; 340/988–996; 342/413, 342/417, 450, 347.44, 357.33
See application file for complete search history.

(56) References Cited

U.S. PATENT DOCUMENTS

| 6,418,373 | B1* | 7/2002 | Omi et al. ............ 701/411 |
| 2001/0004725 | A1 | 6/2001 | Yagyu |
| 2004/0204846 | A1 | 10/2004 | Yano et al. |
| 2008/0010414 | A1* | 1/2008 | Kailas et al. ............ 711/133 |
| 2009/0082953 | A1 | 3/2009 | Shimizu |

FOREIGN PATENT DOCUMENTS

| JP | 10-281784 | 10/1998 |
| JP | 2001-124578 | 5/2001 |
| JP | 2001-174280 | 6/2001 |
| JP | 2003-232645 | 8/2003 |
| JP | 2009-79921 | 4/2009 |

OTHER PUBLICATIONS international Search Report dated Aug. 31, 2010 issued in PCT/JP2010/059284.

* cited by examiner

*Primary Examiner* — Muhammad Shafi
(74) *Attorney, Agent, or Firm* — Scully, Scott, Murphy & Presser, P.C.

(57) ABSTRACT

Conventionally, there has been a learning route-search device that stores therein, as deviation sections, actual traveling routes deviated from optimum routes, and performs route search by substituting, with any one of the deviation sections, a route found by the device if a starting point and an ending point of this deviation section are included in the found route. Such a device substitutes a route with a corresponding one of the deviation sections without exception, and therefore, may sometimes find a circuitous route that is not desired by a user. Provided is a technology by which learned routes are applied in a more appropriate manner in accordance with routes to be found. A route search device is provided with a deviation determining unit adapted to determine whether or not a route deviated from a route found by a route search unit has been taken in travelling. If a route deviated from the route has been taken in travelling, the route search device stores, in association with one another, a road link relating to a position at which the deviated route has started, a road link relating to a position at which retaking of the found route has started, and the deviated route taken in the travelling. The route search device then substitutes at least a part of the foregoing found route with the thus stored route.

4 Claims, 9 Drawing Sheets

LINK TABLE 200

FIG. 3

LEARNED ROUTE TABLE 250

| 251 | 252 | 253 | 254 | 255 | 256 |
|---|---|---|---|---|---|
| LINK JUST BEFORE DEVIATION | DEVIATION LINK | SEQUENCE OF LEARNED ROUTE LINKS | LINK JUST BEFORE RETURNING | RETURN LINK | REPLACEMENT PRIORITY |
| ... | ... | ... | ... | ... | ... |

ROUTE SEARCH DEVICE AND ROUTE SEARCH METHOD

TECHNICAL FIELD

The present invention relates to a route searching technique.

BACKGROUND ART

Conventionally, a navigation system employs a technique relating to a route learning; that is, upon deviating from an optimum route, an actual traveling route is stored as a learned section, and when searching is performed for an optimum route at a later time, in the case where a start point and an end point of the learned section are included in the route, the route from the start point to the endpoint is replaced by the learned section. Patent document 1 describes a technique regarding such navigation system as described above.
PRIOR ART DOCUMENT
Patent Document
[Patent Document 1] Japanese Unexamined Patent Application Publication No. 2001-174280

DISCLOSURE OF THE INVENTION

Problem to be Solved by the Invention

In the navigation system described above, when the route being retrieved includes the start point and the end point of the learned section, the section traveled with deviation substitutes for the route, regardless of whatever route is retrieved. Therefore, there is a possibility that the searching results in a long way around that is not intended by a user.

An object of the present invention is to provide a technique for applying a learned route more appropriately, according to the route being retrieved.

Means to Solve the Problem

In order to solve the problem as described above, the present invention is directed to a route searching device, including a map data storage unit adapted to store map data including a road link, a route searching unit adapted to retrieve a route from a current position to a destination, by using the road link stored in the map data storage unit, a deviation judging unit adapted to determine whether or not traveling is performed with deviation from the route retrieved by the route searching unit, a deviation information storage unit adapted to store, when the deviation judging unit determines that traveling is performed with deviation from the route, a road link relating to a position deviating from the route, a road link relating to a position returning to the route, and a route traveled with deviation, in such a manner as establishing associations with one another, and a route replacement unit adapted to replace at least a part of the route retrieved by the route searching unit with the route stored in the deviation information storage unit.

Furthermore, a route searching method of the present invention is provided, according to a route searching device having a map data storage unit adapted to store map data including a road link, and a route searching unit adapted to retrieve a route from a current position to a destination, by using the road link stored in the map data storage unit, the route searching method including, a deviation judging step for determining whether or not traveling is performed with deviation from the route retrieved by the route searching unit, a deviation information storing step for storing, when the deviation judging step determines that traveling is performed with deviation from the route, a road link relating to a position deviating from the route, a road link relating to a position returning to the route, and a route traveled with deviation, in such a manner as establishing associations with one another, and a route replacing step for replacing at least a part of the route retrieved by the route searching unit with the route stored in the deviation information storing step.

BEST MODE FOR CARRYING OUT THE INVENTION

Hereinafter, with reference to the accompanying drawings, an explanation will be made as to the navigation system 100 being an on-board unit to which one embodiment of the present invention is applied.

Figure 1:
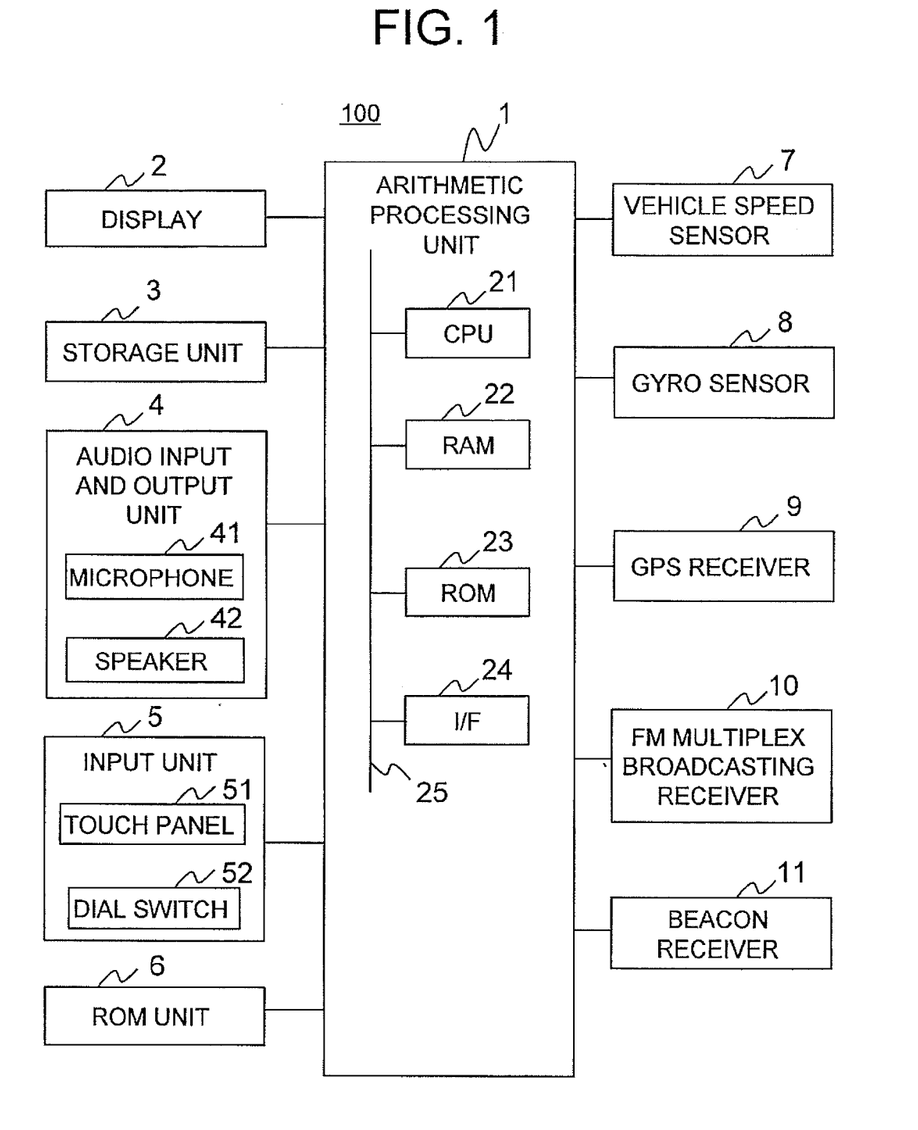
FIG. 1 is a schematic block diagram of the navigation system.

FIG. 1 is a schematic block diagram of the navigation system 100.

The navigation system 100 is provided with an arithmetic processing unit 1, a display 2, a storage unit 3, an audio input and output unit 4 (a microphone 41 as an audio input unit and a speaker 42 as an audio output unit), an input unit 5, an ROM unit 6, a vehicle speed sensor 7, a gyro sensor 8, a GPS (Global Positioning System) receiver 9, an FM multiplex broadcasting receiver 10, and beacon receiver 11.

The arithmetic processing unit 1 is a main unit for performing various processing. By way of example, the arithmetic processing unit 1 detects a current position based on information outputted from various sensors (7, 8), the GPS receiver 9, an FM multiplex broadcasting receiver 10, and the like. On the basis of the current position information being obtained, the arithmetic processing unit 1 reads out from the storage unit 3 or from the ROM unit 6, map data necessary to create a display. Then, the arithmetic processing unit 1 records as a learned route, the route through which traveling has been performed.

Furthermore, the arithmetic processing unit 1 graphically expands the map data being read out, and displays a mark indicating the current position on the display 2 in such a manner as superimposing thereon. The arithmetic processing unit 1 uses the map data and the like stored in the storage unit 3 or in the ROM unit 6 to search for an optimum route (recommended route) connecting a departure place (current position) with a destination designated by the user. On this occasion, the learned rout is used to appropriately specify a route intended by the user. It further uses the speaker 42 and the display 2 to guide the user.

The arithmetic processing unit 1 of the navigation system 100 has a configuration that connects each device via a bus 25. The arithmetic processing unit 1 incorporates a CPU (Central Processing Unit) 21 for executing various processes such as numerical processing and control of each device, RAM (Random Access Memory) 22 for storing map data and operation data read out from the storage unit 3, ROM (Read Only Memory) 23 for storing programs and data, and an I/F (interface) 24 for establishing connection between various hardware and the arithmetic processing unit 1.

The display 2 is a unit for displaying the graphics information generated by the arithmetic processing unit 1 and the like. The display 2 is made up of a liquid crystal display, an organic EL (Electro-Luminescence) display, or the like.

The storage unit 3 is made up of a storage medium at least readable and writable, such as an HDD (Hard Disk Drive) and a non-volatile memory card.

This storage medium stores a link table 200 being the map data (including link data of links constituting roads on a map) which is necessary for a typical route searching device, and a learned route table 250.

Figure 2:
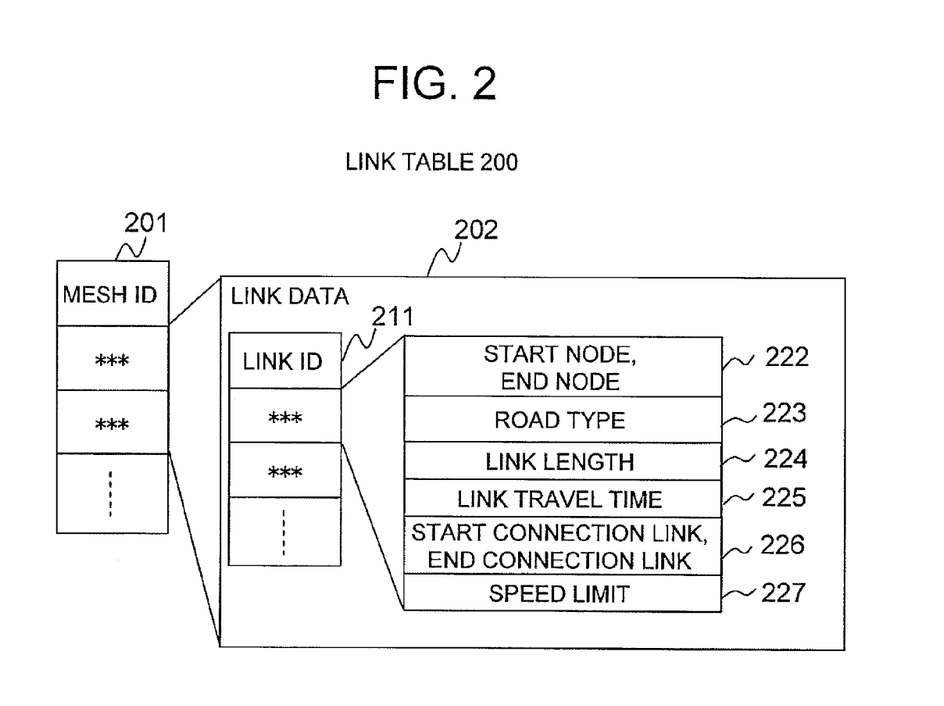
FIG. 2 illustrates a configuration of a link table.

FIG. 2 illustrates a configuration of the link table 200. The link table 200 includes link data 202 of each link constituting a road in a mesh area, with respect to each identification code (mesh ID) 201 indicating a mesh being a region partitioned on the map, the link data representing each link constituting a road included in the mesh region.

The link data 202 includes with respect to each link ID 211 being an identification of the link, coordinate information 222 of two nodes (a start node and an end node) constituting the link, a road type 223 indicating type information of the road including the link, link length information 224 indicating a length of the link, a link travel time 225 stored in advance, a start connection link and an end connection link for specifying respectively, a start connection link connected to a start node of the link and an end connection link connected to an end node of the link, and a speed limit 227 representing a speed limit of the road including the link.

It is to be noted here that there is a distinction between the start node and the end node being the two nodes constituting a link, thereby allowing up-line and down-line of the road to be managed as links different from each other.

Figure 3:
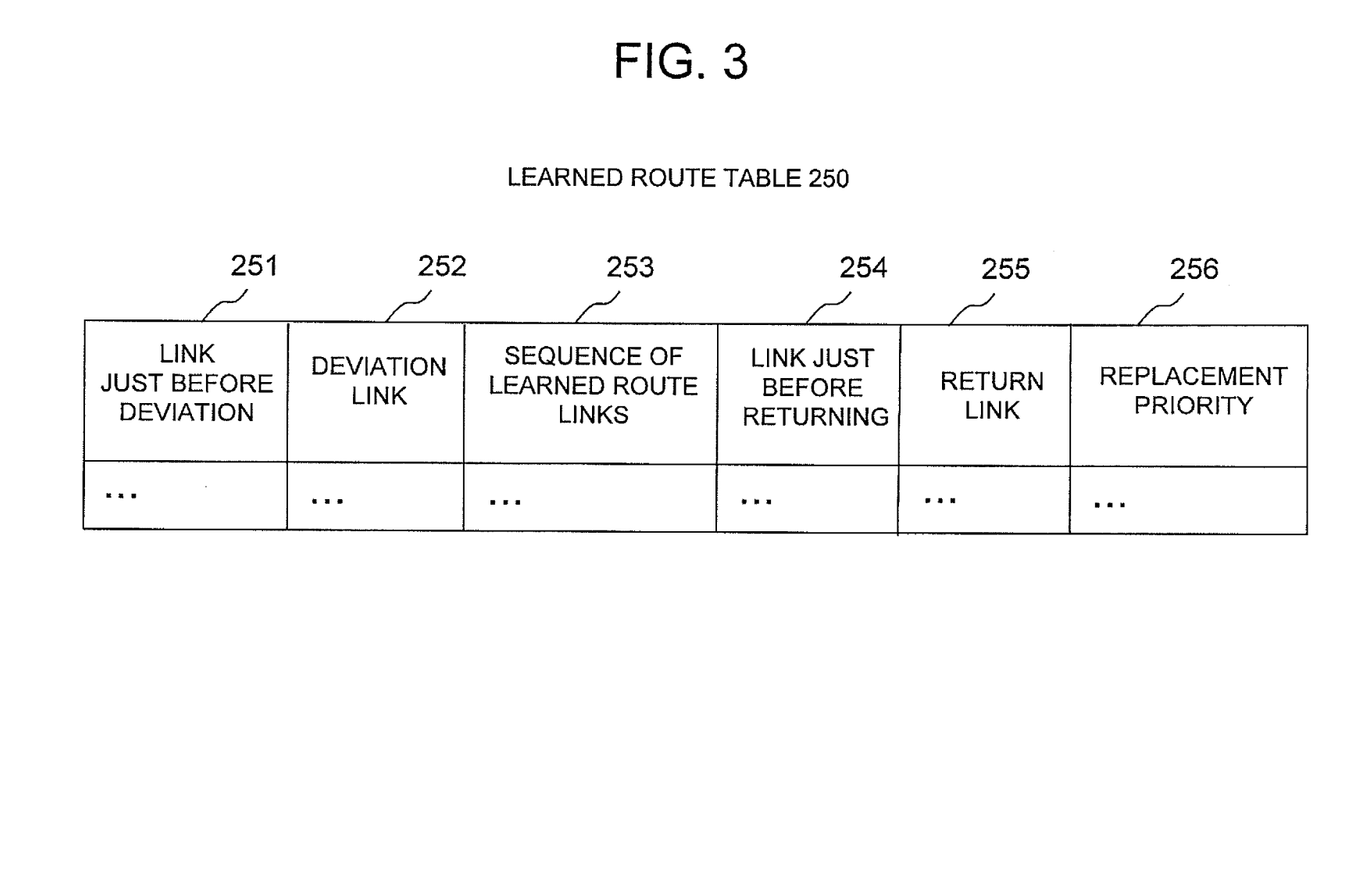
FIG. 3 illustrates a configuration of a learned route table.

FIG. 3 illustrates a configuration of the learned route table 250. The learned route table 250 is a table for recording information that specifies a learned route, with respect to each record being stored. By way of example, the learned route table 250 includes, a link just before deviation 251 and a deviation link 252 which are used to specify a direction to enter the learned route, a sequence of learned route links 253 for specifying links constituting the learned route, a link just before returning 254 and a return link 255 which are used to specify a direction to exit from the learned route, and a replacement priority 256 indicating a degree with which the learned route is prioritized relative to other learned route.

As for the link just before deviation 251, information for specifying the link through which traveling is performed immediately before entering the learned route is stored.

As for the deviation link 252, information for specifying the link through which traveling is performed immediately after entering the learned route is stored.

As for the sequence of learned route links 253, information for specifying the links constituting the learned route is stored, in the order or traveling sequence. By way of example, the links constituting the learned route include route information which is made up of links on the way of the route, the links following the deviation link and arranged in the order of passing sequence, and a link just before returning that is the last link of this route information.

As for the link just before returning 254, information for specifying the link through which traveling is performed immediately before exiting from the learned route is stored.

As for the return link 255, information for specifying the link through which traveling is performed immediately after exiting from the learned route is stored.

The replacement priority 256 indicates a degree with which the learned route is prioritized compared to other learned route. In the present embodiment, the larger the value of the replacement priority is, the more the learned route is prioritized in application, relative to other learned route.

Here, an explanation will be made, referring to FIG. 1 again. The audio input and output unit 4 is provided with the microphone 41 as an audio input unit, and the speaker 42 as an audio output unit. The microphone 41 captures audio data from the outside of the navigation system 100, such as voice of a driver and other passengers.

The speaker 42 outputs a message to the user as an audio signal, generated by the arithmetic processing unit 1. The microphone 41 and the speaker 42 are separately mounted on predetermined portions of a vehicle. It is to be noted that an enclosure may accommodate these elements in an integrated manner. The navigation system 100 maybe provided with multiple microphones 41 and multiple speakers 42.

The input unit 5 is a unit for accepting a directive from the user, via a manipulation by the user. The input unit 5 is made up of the touch panel 51, the dial switch 52, and other hard switches (not illustrated) such as a scroll key and a scaling key.

The touch panel 51 is mounted on a display screen side of the display 2, being a transparent to make the display screen visible. The touch panel 51 is used to specify a touch position in association with XY coordinates of the image displayed on the display 2, convert the touch position to coordinates, and output the coordinates. The touch panel 51 is made up of pressure-sensitive type or electrostatic type input detecting elements, or the like.

The dial switch 52 is constructed in rotatable manner, both in the clockwise direction and in the anticlockwise direction, issues a pulse signal according to a rotation by a predetermined angle, and outputs the pulse signal to the arithmetic processing unit 1. The arithmetic processing unit 1 obtains a rotation angle based on the number of the pulse signals.

The ROM unit 6 is made up of a storage medium, at least readable, such as an ROM (Read Only Memory) including a CD-ROM, a DVD-ROM, and the like, and an IC (Integrated Circuit) card. This storage medium stores audio data, video data, and the like, for instance.

The vehicle speed sensor 7, the gyro sensor 8, and the GPS receiver 9 are used to detect a current position (location of one's own vehicle) by the navigation system 100.

The vehicle speed sensor 7 is a sensor for outputting a value that is used to calculate a vehicle speed.

The gyro sensor 8 is made up of an optical fiber gyroscope, a vibrating gyroscope, or the like, to detect an angular rate according to a rotation of a moving object.

The GPS receiver 9 receives a signal from a GPS satellite, measures a distance between the moving object and the GPS satellite, and a rate of change of the distance, with respect to at least three satellites, thereby obtaining the current position, a travelling speed, and traveling azimuth of the moving object.

The FM multiplex broadcasting receiver 10 receives an FM multiplex broadcasting signal that is transmitted from an FM multiplex broadcasting station. The FM multiplex broadcasting information includes brief current traffic information, information on restrictions, SA/PA (service area/parking area) information, parking lot information, weather information, and the like, according to the VICS (Vehicle Information Communication System: registered trademark), and character information and the like, provided by a radio station as FM multiplex general information.

The beacon receiver 11 receives the VICS information and the like, including brief current traffic information, information on restrictions, SA/PA (service area/parking area) information, parking lot information, weather information, emergency alert, and the like. By way of example, it is a unit to receive an optical beacon for optical communication, a radio beacon for radio communication, or the like.

Figure 4:
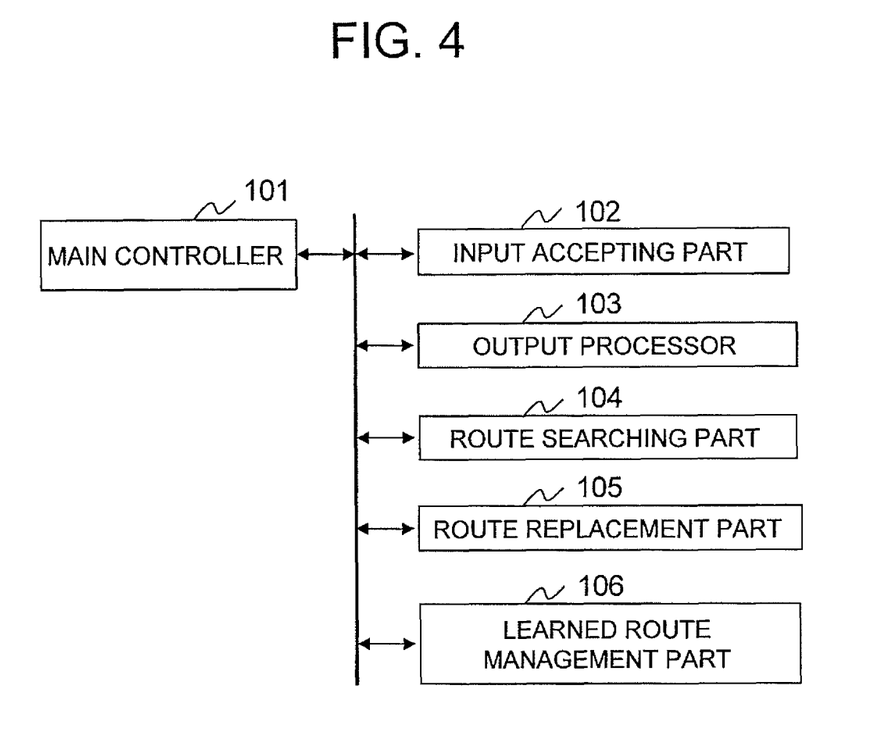
FIG. 4 is a functional block diagram of an arithmetic processing unit.

FIG. 4 is a functional block diagram of the arithmetic processing unit 1. As illustrated, the arithmetic processing unit 1 includes a main controller 101, an input accepting part 102, an output processor 103, a route searching part 104, a route replacement part 105, and a learned route management part 106.

The main controller 101 is a key functional part for performing various processing, and controls other processors according to processing descriptions. The main controller 101 further acquires information from various sensors, the GPS receiver 9, and the like, and requests the map matching part 104, and the like, to specify the current position. In addition, the main controller 101 establishes associations between a date and time when traveled, and the position, as needed, and stores in the storage unit 3, a driving route history with respect to each link. In response to a request from each of the processors, the main controller 101 outputs the current time. It further searches for an optimum route (recommended route) connecting a departure place (current position) and a destination indicated by the user, and guides the user not to deviate from the recommended route, by using the speaker 42 and the display 2.

The input accepting part 102 accepts a directive from the user inputted via the input unit 5 or inputted via the microphone 41, and controls each part of the arithmetic processing unit 1 to execute the process in association with the requested descriptions. For example, upon a request from the user to search for a recommended route, the input accepting part requests the output processor 103 to perform the processing to display a map on the display 2, so as to allow a setting of a destination.

The output processor 103 receives screen information to be displayed, converts the screen information into signals to be drawn on the display 2, and gives a directive to the display 2 to perform the drawing.

The route searching part 104 searches for a route to reach the destination, by using information indicating the current position detected by the main controller 101, and the map data and the like stored in the link table 200. Specifically, the route searching part 104 assumes the position indicated by the information representing the current position as a departure place, and searches for a route to reach the destination, according to a route searching method such as Dijkstra's Algorithm. It is to be noted that the route searching part 104 requests the route replacement part 105, to replace a part of the route obtained as a result of the searching, with a learned route having a high priority in the case where a predetermined condition is satisfied. It is also to be noted that the route searching part 104 does not apply the learned route again for replacement as to a portion having been replaced by another learned route on the route. The route searching part 104 stores the route on which the learned route is reflected, as a recommended route.

Upon searching for a route by the route searching part 104, the route replacement part 105 replaces a part of the route retrieved by the route searching part 104 with the learned route, when a predetermined condition is satisfied. The predetermined condition is whether or not the start point and the end point of the learned route are included in the route, and whether or not the traveling direction on the start point and the traveling direction on the end point respectively coincide with those on the route being retrieved (specifically, as for the start point, whether or not a link just before the start point is included in the route, and as for the end point, whether or not a link just after the end point is included in the route). In other words, the route replacement part 105 considers the direction upon entering the learned route and the direction upon exiting from the learned route, so as to determine whether or not the route is to be replaced by the learned route.

The learned route management part 106 records the learned route. The learned route management part 106 further manages a replacement priority of the learned route. In other words, the learned route management part 106 registers a route to be learned newly, and manages the replacement priority as to the learned route already registered. Specifically, when traveling is performed being deviated from the recommended route, the learned route management part 106 specifies a section being deviated (a section from the point where deviation is started to the point where traveling is returned to the recommended route) as a deviating section. Then, it is determined whether or not the specified deviating section has already been registered as a learned route in the learned route table 250. If it has already been registered, the replacement priority of the learned route is made higher, and if not registered yet, this deviating section is newly registered as a learned route.

The learned route management part 106 further determines whether or not any already-registered learned route is included in the route through which traveling is performed without setting any recommended route. If the route includes the already-registered learned route, the replacement priority of the learned route is made higher.

On the other hand, the learned route management part 106 reduces the replacement priority of each learned route registered in the learned route table 250, at established periods (e.g., every two weeks). With this configuration, as to the priority of a route newly registered as the learned route and the priority of the learned route through which traveling has been performed many times, a difference of the priorities can be limited to be within a predetermined range, thereby facilitating a reversal in priority to some extent. By way of example, in order to make the replacement priority of the learned route having the maximum replacement priority to be 10 or less, the learned route management part 106 subtracts a uniform value from the replacement priorities of all the other learned routes (it is to be noted that the replacement priority does not become a negative value, and it is at least zero). Accordingly, a difference in priority is allowed to be within a predetermined range.

The CPU 21 reads in and executes predetermined programs, thereby constructing each of the functional parts of the aforementioned arithmetic processing unit 1; that is, the main controller 101, the input accepting part 102, the output processor 103, the route searching part 104, the route replacement part 105, and the learned route management part 106. Therefore, the RAM 21 stores programs to implement processing of each functional part.

It is to be noted that the constitutional elements described above are categorized according to the processing descriptions, so as to facilitate understanding of the configuration of the navigation system 100. Categorizing method of the constitutional elements or the names thereof may not restrict the scope of the present invention. The configuration of the navigation system 100 may be categorized into more various constitutional elements according to processing descriptions.

It is alternatively possible to categorize the elements in such a manner that one constitutional element executes more various processing.

It is further possible that each of the functional parts maybe established by using hardware (ASIC, GPU, or the like). A piece of hardware may execute the processing of each of the functional parts, or multiple pieces of hardware may execute the same.

[Descriptions of Operation]

Next, an explanation will be made as to an operation of the navigation system 100.

Figure 5:
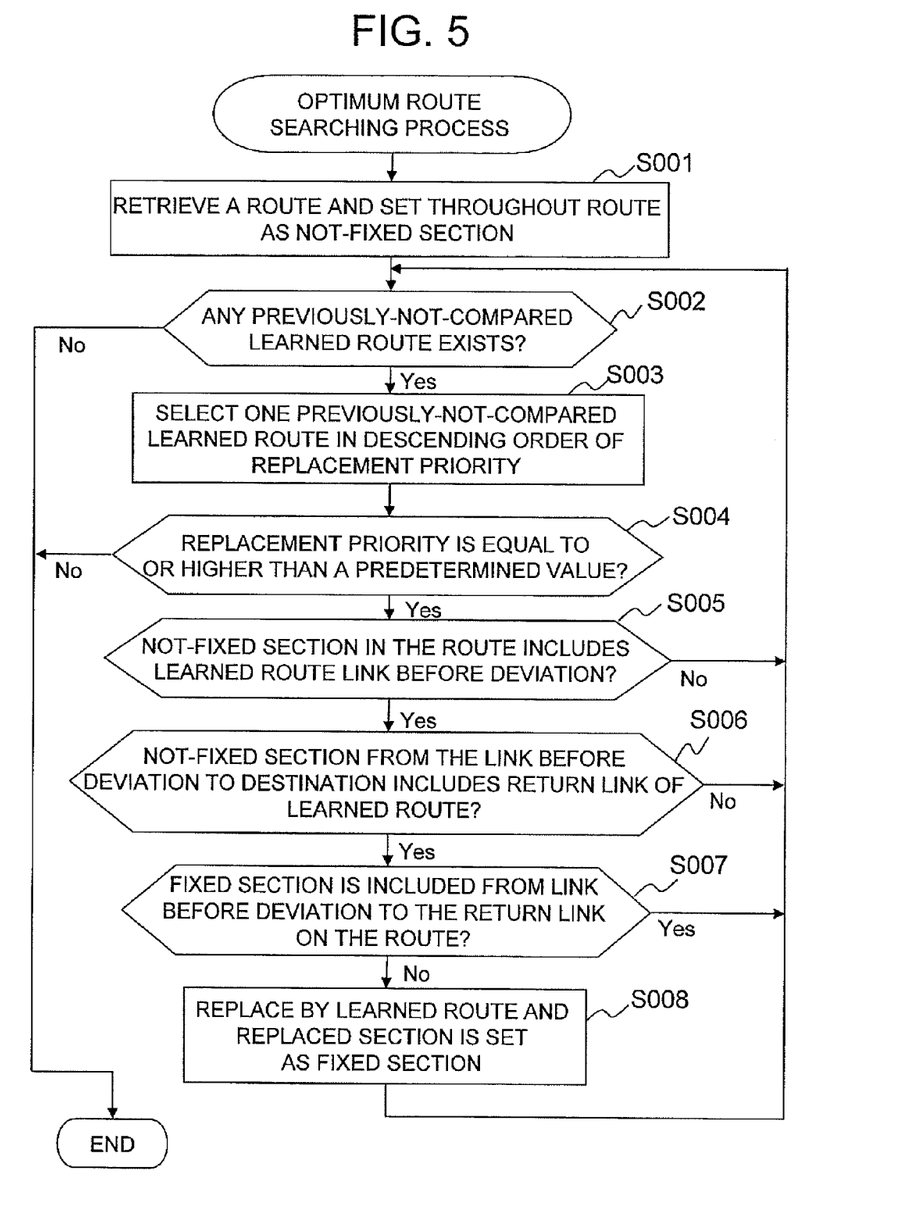
FIG. 5 is a flow chart showing an optimum route searching process.

FIG. 5 is a flowchart showing an optimum route searching process for determining whether or not a route being retrieved includes a part to be replaced by a learned route, and if it is included, the navigation device 100 replaces the part with the learned route. This flow is started when the navigation device 100 accepts a directive to perform route searching from a user with a designation of a destination.

Firstly, the route searching part 104 searches for a route from a departure place up to a destination. In this search, an ordinary route searching logic is applied, for example, a route searching logic such as Dijkstra's Algorithm. Then, the route replacement part 105 sets throughout the route being retrieved (hereinafter, referred to as "retrieved route") as "not-fixed section" (step S001). Specifically, the route replacement part 105 establishes associations between all the links constituting the route obtained by searching, and the information indicating that the links are "not-fixed sections".

Next, the route replacement part 105 searches the learned route table 250 to determine whether or not a previously-not-compared learned route is included in the retrieved route (step S002). Specifically, the route replacement part 105 determines that there is no previously-not-compared learned route, in the case where all the learned routes being included in the learned route table 250 have been subjected to the processes from the step S003.

In the case where there is no previously-not-compared learned route ("No" in the step S002), the route replacement part 105 passes the information of the retrieved route finally obtained to the route searching part 104, and terminates the optimum route searching process.

In the case where there is a previously-not-compared learned route ("Yes" in the step S002), the route replacement part 105 selects one previously-not-compared learned route, in descending order of the replacement priority 256 (step S003).

Next, the route replacement part 105 determines whether or not a value of the replacement priority 256 of the selected learned route is equal to or higher than a predetermined value (e.g., the replacement priority "3") (step S004). When the value of the replacement priority is lower than the predetermined value, the route replacement part 105 passes the information of the retrieved route obtained by the optimum route searching process to the route searching part 104, and terminates the optimum route searching process.

When the value of the replacement priority is equal to or higher than a predetermined value, the route replacement part 105 determines whether or not there is included a link just before deviation 251 of the selected learned route, in the section set as the not-fixed section within the retrieved route (S005).

In the case where the link just before deviation 251 of the selected learned route is not included in the route ("No" in step S005), the route replacement part 105 assumes the learned route as already subjected to comparison, and returns the process to the step S002.

In the case where the link just before deviation 251 of the selected learned route is included ("Yes" in step S005), the route replacement part 105 determines whether or not the return link 255 of the learned route is included in the not-fixed section from the link just before deviating from the retrieved route, to the destination (step S006).

In the case where the return link of the learned route is not included in the not-fixed section from the link just before deviation to the destination ("No" in step S006), the route replacement part 105 assumes the learned route as already subjected to comparison, and returns the process to the step S002.

In the case where the return link of the learned route is included in the not-fixed section from the link just before deviation to the destination ("Yes" in step S006), the route replacement part 105 determines whether or not a fixed section is included in the section from the link just before deviation to the return link on the route (step S007).

In the case where the fixed section is included in the section from the link just before deviation to the return link on the route ("Yes" in step S007), the route replacement part 105 assumes the learned route as already subjected to comparison, and returns the process to the step S002.

In the case where the fixed link is not included in the section from the link just before deviation to the return link on the route ("No" in step S007), the route replacement part 105 replaces the section from the link just before deviation to the return link on the route, with the learned route, and the links included in the replaced section are set as the fixed section, and returns the process to the step S002 after setting the learned route as already subjected to comparison.

The descriptions above are processing details of the optimum route searching process.

By executing the optimum route searching process as described above, the navigation system 100 is allowed to replace a part of the route with the learned route, when a predetermined condition is satisfied upon searching for a route. In addition, the condition required for the replacement is that an entering direction into the learned route on the route targeted for replacement matches the information regarding the entering direction provided in the learned route, and a direction exiting from the learned route on the route targeted for replacement matches the information regarding exiting direction provided in the learned route. Therefore, even though the route includes a start point and an end point of the learned route, if it has a different entering direction into the learned route, or a different exiting direction from the learned route, the replacement is not performed and this allows an application of the learned route to be performed as intended by the user.

In the optimum route searching process as described above, the information such as the not-fixed section and the fixed section is used, thereby controlling so as not to perform a second replacement as to the section which has already been replaced by the learned route and the section which includes such already replaced section. Accordingly, a control is exerted so as not to apply the route that does not have high replacement importance, as well as avoiding retrieval of a route which is excessively long way around and complicated.

Here, with reference to FIG. 6 and FIG. 7, specific examples of the replacement by the learned route will be explained, contrasting one example with the other. FIG. 6 and FIG. 7 illustrate examples of learned route application by the navigation system relating to the present invention.

FIG. 6 and FIG. 7 illustrate nodes 321N to 326N and links 310L to 316L connected to nodes 321N to 326N; nodes 341N and 342N and links 331L to 333L connected to 341N and 342N, respectively; nodes 361N and 362N and links 351L to 353L connected to nodes 361N and 362N; and a link 354L connected to a node 325N.

As illustrated, the link 310L is connected to the link 311L at the node 321N. The link 311L is connected to the link 312L, link 331L, and link 353L, at the node 322N. The link 312L is connected to the link 313L at the node 323N. The link 313L is connected to the link 314L at the node 324N. The link 314L is connected to the link 315L, link 333L, and link 354L at the node 325N. The link 315L is connected to the link 316L at the node 326N.

In addition, the link 351L is connected to the link 352L at the node 361N, and the link 352L is connected to the link 353L at the node 362N. The link 353L is connected to the link 311L, link 312L, and link 331L at the node 322N. The link 331L is connected to the link 332L at the node 341N. The link 332L is connected the link 333L at the node 342N. The link 333L is connected to the link 314L, link 315L, and link 354L at the node 325N.

There are crossroads at the node 322N, and the road including the link 311L and the link 312L crosses the road including the link 353L and the link 331L. Similarly, there are crossroads at the node 325N, and the road including the link 314L and the link 315L crosses the road including the link 333L and the link 354L.

Figure 6A:
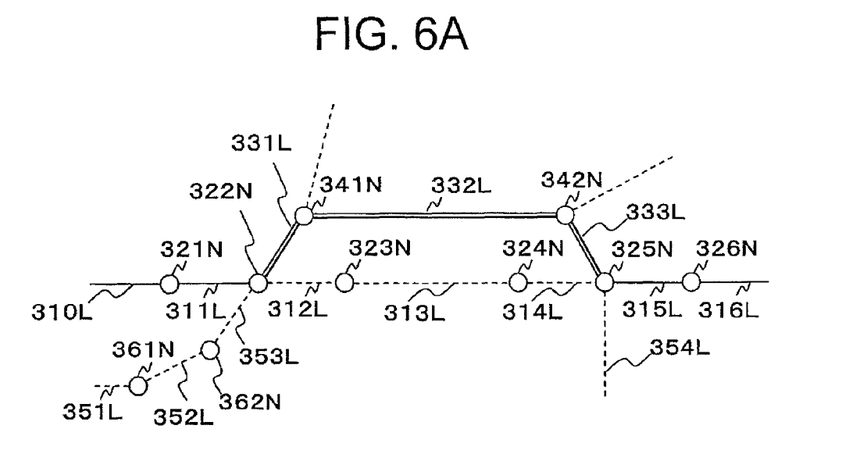
FIG. 6 illustrates replacement by the learned route not intended by the user.
Figure 6B:
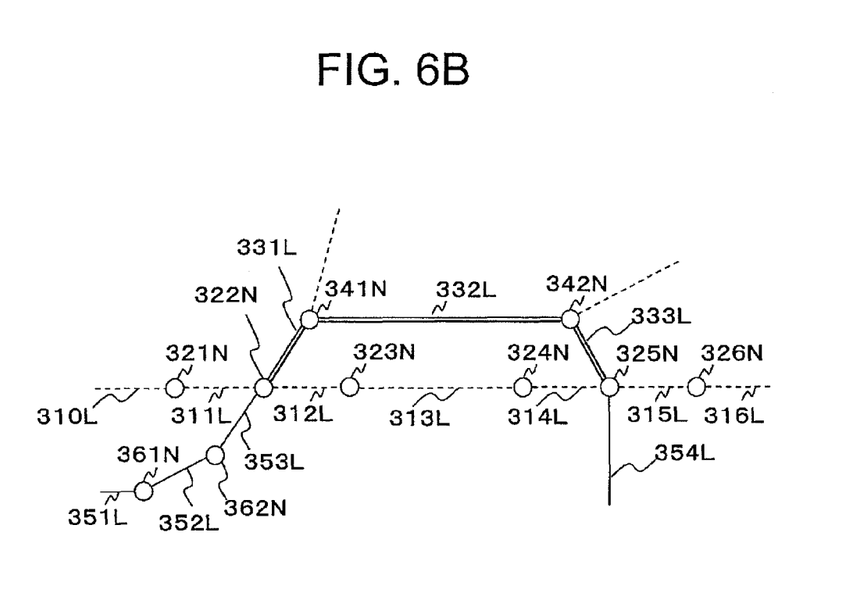
Figure 7A:
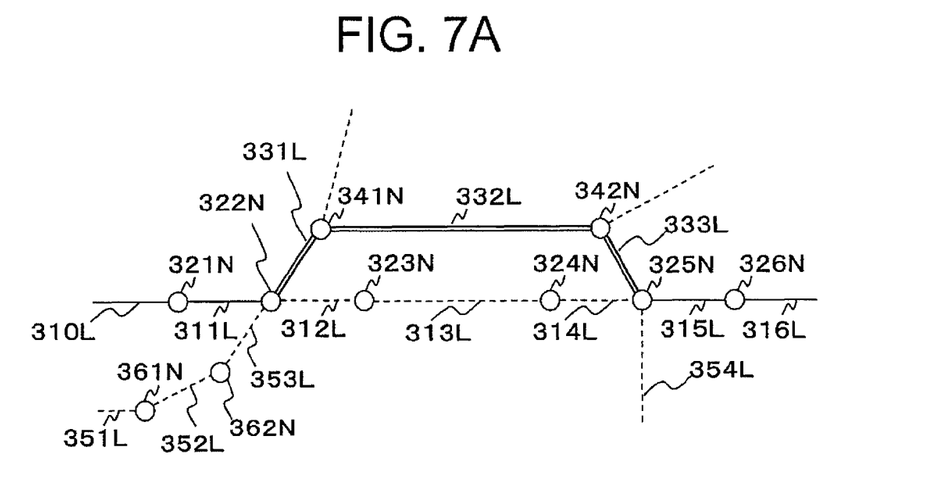
FIG. 7 illustrates replacement by the learned route as intended by the user.
Figure 7B:
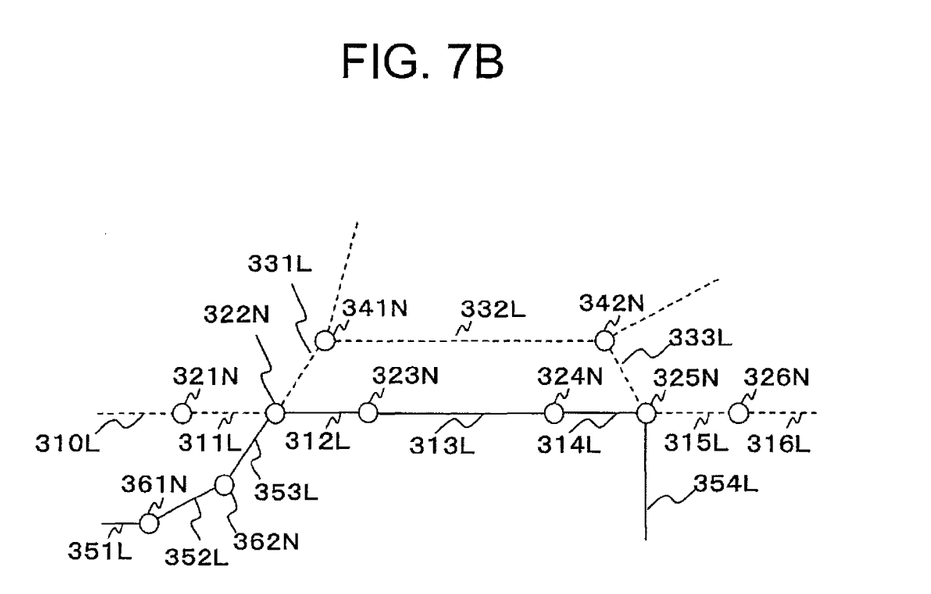

FIG. 6A and FIG. 6B will be explained, assuming that the learned route is registered as a route passing through the node 322N, node 341N, node 342N, and node 325N. FIG. 6A is contrasted with FIG. 6B, so as to explain the present invention which considers a direction of entering the learned route and a direction of exiting from the learned route. FIG. 7A and FIG. 7B illustrate a process for applying the learned route according to the present invention.

FIG. 6A illustrates the case where the route retrieved without considering the learned route corresponds to a route which passes through the node 321N, node 322N, node 323N, node 324N, node 325N, and node 326N. On this occasion, the route passes through the node 322N being the start node of the learned route and the node 325N being the end node thereof, and therefore, the section from the node 322N to the node 325N is replaced by the learned route, thereby establishing a retrieved route.

FIG. 6B illustrates the case where the route retrieved without considering the learned route corresponds to a route which passes through the node 361N, node 362N, node 322N, node 323N, node 324N, node 325N, and link 354L. Also in this case, the retrieved route corresponds to a route passing through the node 322N being the start node of the learned route, and the node 325N being the end node thereof. Therefore, the section from the node 322N to the node 325N is replaced by the learned route and establishes a retrieved route. However, particularly in FIG. 6B, when the learned route is applied, it results in going a longer way round, and in reality, there is a possibility that the route is different from the one desired by the user.

Here, with reference to FIG. 7A and FIG. 7B, an explanation will be made as to an application of a learned route, in the case where the navigation system 100 of the present invention is employed and the learned route is registered as a route passing through the node 322N, node 341N, node 342N, and node 325N.

In the optimum route searching process relating to the present invention, the learned route includes a concept of an enter direction and an exit direction. Therefore, it is assumed here that the link just before deviation is 311L, the deviation link is 331L, the link just before returning is 333L, and the return link is 315L.

FIG. 7A illustrates the case where the route being retrieved without considering the learned route corresponds to a route which passes through the node 321N, node 322N, node 323N, node 324N, node 325N, and node 326N. On this occasion, this route passes through the link 311L being the learned route link just before deviation, and also passes through the return link 315L. Therefore, the section from the node 322N to the node 325N is replaced by the learned route, and it becomes the retrieved route.

On the other hand, FIG. 7B illustrates that the route retrieved without considering the learned route corresponds to a route which passes through the node 361N, node 362N, node 322N, node 323N, node 324N, node 325N, and link 354L. On this occasion, this route does not pass through the link 311L being the learned route link just before deviation, nor the return link 315L. Therefore, the section from the node 322N to the node 325N is not replaced by the learned route. Accordingly, unlike the case of FIG. 6B, in particular, the application of the learned route is not performed, thereby avoiding going long way around, and there is a high possibility that the route becomes a user desired route.

As thus described, the optimum route searching process relating to the present invention is applied, thereby enabling an application of the learned route with consideration of the direction entering the learned route and the direction exiting from therefrom. Therefore, the application of the learned route can be performed more appropriately.

Figure 8:
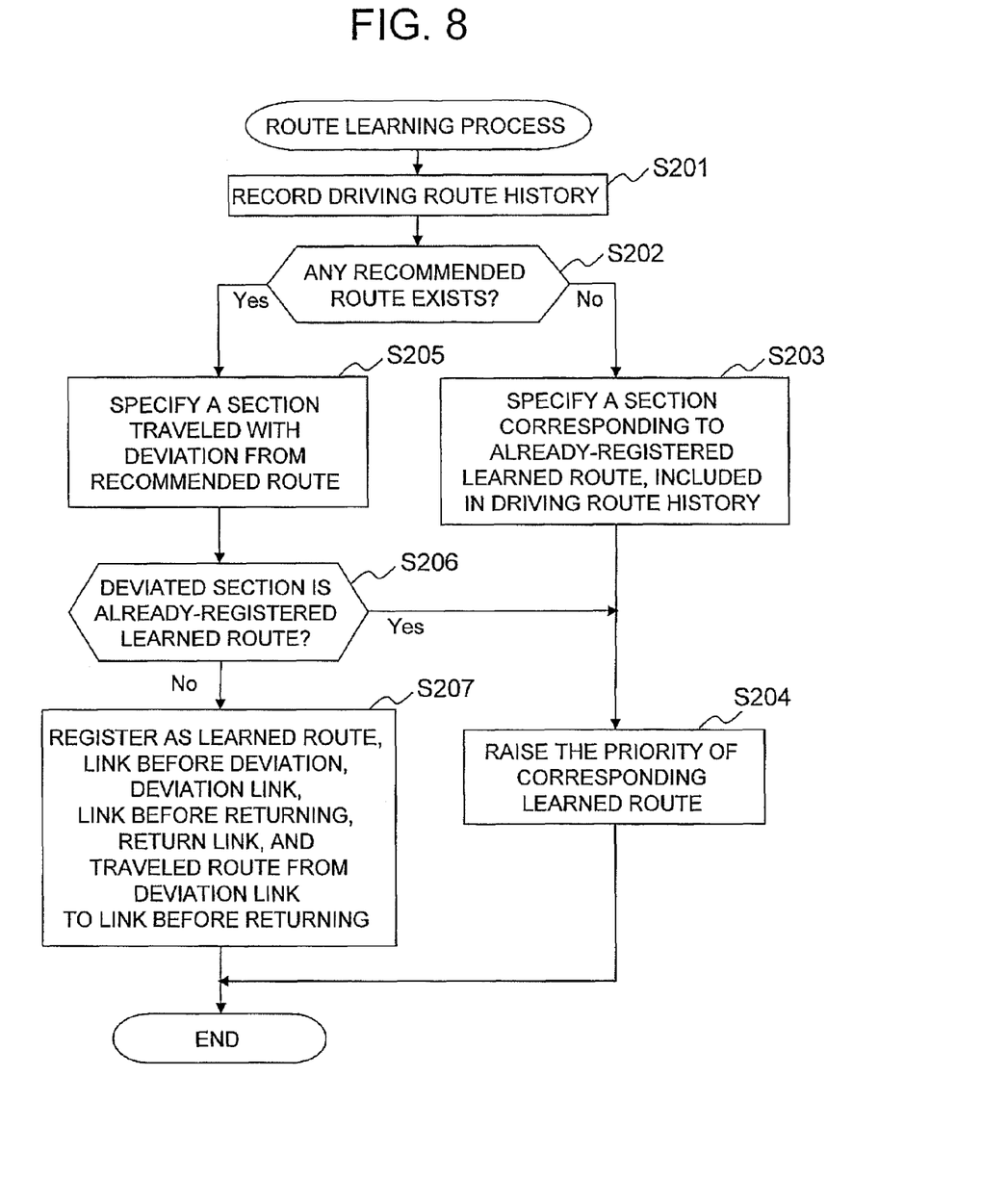
FIG. 8 is a flowchart showing a route learning process.

In addition, with reference to FIG. 8, an explanation will be made as to the route learning process which manages replacement priority in the present embodiment. FIG. 8 is a flow chart regarding the route learning process. This flow is started when a vehicle equipped with the navigation system 100 finishes driving; for example, in the end process of the navigation system.

Firstly, the main controller 101 records a driving route history (step S201). Specifically, the main controller 101 records the current position information at a predetermined timing during the period of traveling, specifies and records a link to which the position belongs.

Next, the learned route management part 106 determines whether or not a recommended route was set during the period of traveling, i.e., after activating the navigation system 100 most recently (step S202).

If the recommended route was not set ("No" in step S202), the learned route management part 106 specifies a section that is included in driving route history and corresponds to an already-registered learned route (step S203).

Then, the learned route management part 106 raises the priority of the pertinent learned route. Then, the learned route management part 106 terminates the route learning process (step S204). Subsequently, the learned route management part 106 increments by a predetermined value, the value of the replacement priority 256 of the already-registered learned route that is specified in the step S203 (for example, "increment by 1").

If the recommended route was set ("Yes" in step S202), the learned route management part 106 specifies a section traveled in deviation from the recommended route (step S205). Then, the learned route management part 106 determines whether or not the deviating section coincides with the already-registered learned route (step S206).

If the deviating section coincides with the already-registered learned route ("Yes" in the step S206), the learned route management part 106 executes the step S204 next.

If the deviation section does not coincide with the learned route ("No" in the step S206), the learned route management part 106 specifies as to the deviating section, a link just before deviation, a deviation link, a link just before returning, a return link, and a traveled route from the deviation link to the link just before returning, and registers those elements in the learned route table. Then, the learned route management part 106 terminates the route learning process (step S207).

The descriptions above are the processing details of the route learning process.

By carrying out the route learning process, it is possible to perform registration of the learned route and management of the replacement priority of the learned route after the traveling. In particular, it is possible to manage the learned route as to the travel in the state where any recommended route is not set, and this enables an appropriate learning. In many cases, a user does not perform route searching, particularly upon driving through a well known place. By reflecting the traveled route through this kind of well known place on the learning status, it is possible to set an optimum route which responds to the user's driving practices.

One embodiment of the present invention has been explained according to the descriptions above.

According to one embodiment of the present invention, the navigation system 100 reduces the possibility of retrieving a route that is long way around, not desired by the user, and it is possible to apply more appropriate learned route in response to the route to be retrieved.

It is further possible to learn the route, from the driving route history which is obtained after traveling in the state where a recommended route is not set.

The present invention is not limited to the aforementioned embodiment. The embodiment described above may be variously modified without departing from the spirit of the present invention. For example, it is possible to change the optimum route searching process to the processing details as shown in FIG. 9.

Figure 9:
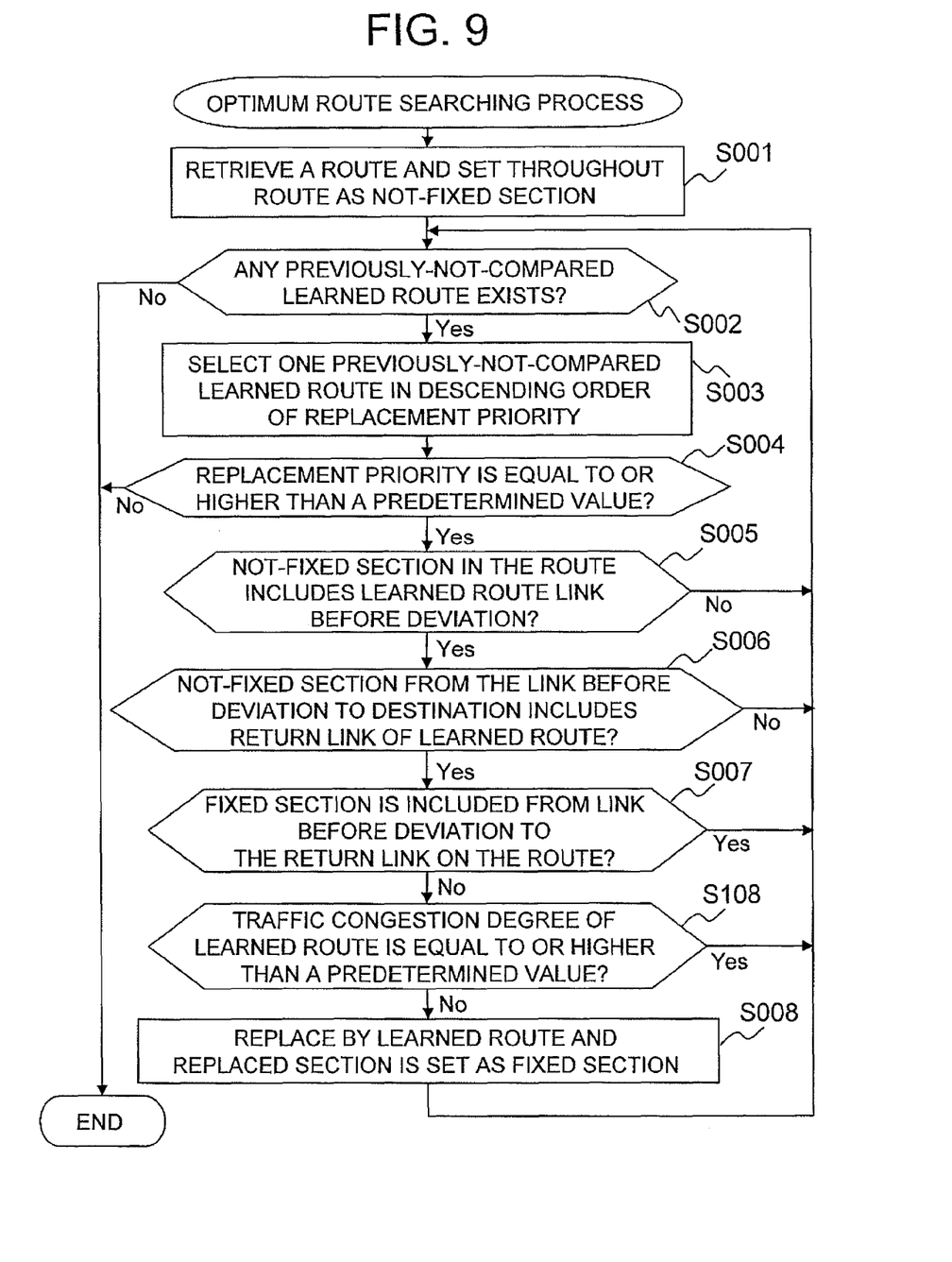
FIG. 9 is a modification of the optimum route searching process.

FIG. 9 shows basically the same flow as the flow of the optimum route searching process as shown in FIG. 5. However, it is different from the flow shown in FIG. 5 in the point that the process of the step S108 is carried out between the step S007 and the step S008.

The step S108 represents a process that when a traffic congestion degree of the learned route used for replacement is equal to or higher than a predetermined value, the replacement is not performed. Specifically, the route replacement part 105 stops replacement by the learned route, when the learned route used for replacement includes a link which has the traffic congestion degree equal to or higher than the predetermined value. Alternatively, the route replacement part 105 compares the traffic congestion degree included in the learned route with the traffic congestion degree of the route to be replaced, and if the link of the learned route is more congested, the replacement is stopped. It is to be noted that the route replacement part 105 uses the traffic congestion degree acquired from brief current traffic information such as the information of the VICS (Vehicle Information Communication System).

This process is not necessarily performed between the step S007 and the step S008. It may also be performed between any of the steps from the step S003 to the step S008. For example, it may be performed between the step S004 and the step S005.

With the configuration as described above, it is possible to reflect the learned route on the recommended route more appropriately.

In the embodiment as described above, the learned route is selected from the previously-not-compared learned routes, in descending order of the replacement priority in the optimum route searching process step S003, but this is not the only example. By way of example, it is possible that the learned routes in the learned route table 250 are sorted and stored in advance in descending order of the replacement priority 256. In this case, the route replacement part 105 selects the learned route according to the sorted order in the step S003. With this configuration, it is possible to hold down the processing load when the route search is performed.

This is one example of modification.

It is to be noted that an explanation has been made as to the example where the present invention is applied to a vehicle-mounted navigation system. However, the present invention is not limited to the vehicle-mounted navigation system, but it is applicable to all aspects of navigation system.

Explanation Of References

1 . . . ARITHMETIC PROCESSING UNIT, 2 . . . DISPLAY, 3 . . . STORAGE UNIT, 4 . . . AUDIO INPUT AND OUTPUT UNIT, 5 . . . INPUT UNIT, 6 . . . ROM UNIT, 7 . . . VEHICLE SPEED SENSOR, 8 . . . GYRO SENSOR, 9 . . . GPS RECEIVER, 10 . . . FM MULTIPLEX BROADCASTING RECEIVER, 11 . . . BEACON RECEIVER, 21 . . . CPU, 22 . . . RAM, 23 . . . ROM, 24 . . . I/F, 25 . . . BUS, 41 . . . MICROPHONE, 42 . . . SPEAKER, 51 . . . TOUCH PANEL, 52 . . . DIAL SWITCH, 100 . . . NAVIGATION SYSTEM, 101 . . . MAIN CONTROLLER, 102 . . . INPUT ACCEPTING PART, 103 . . . OUTPUT PROCESSOR, 104 . . . ROUTE SEARCHING PART, 105 . . . ROUTE REPLACEMENT PART, 106 . . . LEARNED ROUTE MANAGEMENT PART, 200 . . . LINK TABLE, 250 . . . LEARNED ROUTE TABLE

What is claimed is:

1. A route searching device, comprising:
a map data storage unit adapted to store map data including a road link;
a route searching unit adapted to retrieve a route from a current position to a destination, by using the road link stored in the map data storage unit;
a deviation judging unit adapted to determine whether or not traveling is performed with deviation from the route retrieved by the route searching unit;
a deviation information storage unit adapted to store, when the deviation judging unit determines that traveling is performed with deviation from the route, a road link relating to a position deviating from the route, a road link relating to a position returning to the route and a route traveled with deviation, in such a manner as establishing associations with one another; and
a route replacement unit adapted to replace at least a part of the route retrieved by the route searching unit with the route stored in the deviation information storage unit;
wherein the deviation information storage unit stores the route traveled with deviation in association with a replacement priority;
wherein the deviation information storage unit raises the replacement priority of the route traveled with deviation in the case where a route traveled under a condition that a route retrieved by the route searching unit is not set includes a route corresponding to the route traveled with deviation, wherein, when a traffic congestion degree of the route traveled with deviation stored in the deviation information storage unit is equal to or higher than a predetermined value, the route replacement unit does not perform the replacement of the at least the part of the route retrieved by the route searching unit with the route stored in the deviation information storage unit.

2. The route searching device according to claim 1, wherein:
the deviation information storage unit stores a link just before deviation being a link just before deviating from the route retrieved by the route searching unit, as the road link relating to the position deviating from the route, and stores a link just after returning to the route retrieved by the route searching unit, as the road link relating to the position returning to the route; and
the route replacement unit performs replacement of the route in the case where the link just before deviation and the link just after returning are included in the route retrieved by the route searching unit.

3. The route searching device according to claim 1, wherein the route replacement unit excludes as a target of the replacement, by a potential replacement route, a route including a section that has been replaced by a route with a replacement priority higher than that of the potential replacement route.

4. A route searching method using a route searching device, the route searching device comprising a map data storage unit adapted to store map data including a road link and a route searching unit adapted to retrieve a route from a current position to a destination, by using the road link stored in the map data storage unit, the route searching method comprising:

a deviation judging step performed by the route searching device for determining whether or not traveling is performed with deviation from the route retrieved by the route searching unit;

a deviation information storing step performed by the route searching device for storing, when the deviation judging step determines that traveling is performed with deviation from the route, a road link relating to a position deviating from the route, a road link relating to a position returning to the route, and a route traveled with deviation, in such a manner as establishing associations with one another; and a route replacing step performed by the route searching device for replacing at least a part of the route retrieved by the route searching unit with the route stored in the deviation information storing step;

wherein, when a traffic congestion degree of the route traveled with deviation stored by the deviation information storing step is equal to or higher than a predetermined value, the route replacement step does not perform the replacement of the at least the part of the route retrieved by the route searching unit with the route stored in the deviation information storing step.

* * * * *